US006903154B2

(12) United States Patent
Stafford et al.

(10) Patent No.: US 6,903,154 B2
(45) Date of Patent: Jun. 7, 2005

(54) POLYESTERS AND POLYESTER CONTAINERS HAVING A REDUCED COEFFICIENT OF FRICTION AND IMPROVED CLARITY

(75) Inventors: Steven Lee Stafford, Gray, TN (US); Ronald Richard Light, Kingsport, TN (US); Louis Thomas Germinario, Kingsport, TN (US); Emerson Eston Sharpe, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/777,172

(22) Filed: Feb. 13, 2004

(65) Prior Publication Data

US 2004/0228994 A1 Nov. 18, 2004

Related U.S. Application Data

(63) Continuation of application No. 10/105,488, filed on Mar. 25, 2002.
(60) Provisional application No. 60/280,295, filed on Mar. 30, 2001.

(51) Int. Cl.$^7$ ............................................... C08K 3/34
(52) U.S. Cl. ..................................................... 524/451
(58) Field of Search ......................................... 524/451

(56) References Cited

U.S. PATENT DOCUMENTS

| | | | |
|---|---|---|---|
| 3,368,995 A | 2/1968 | Furukswa et al. | |
| 3,516,957 A | 6/1970 | Gray, Jr. et al. | |
| 3,624,024 A | 11/1971 | Caldwell et al. | |
| 3,859,245 A | 1/1975 | Stieler et al. | |
| 3,884,870 A | 5/1975 | Dodson et al. | |
| 3,968,183 A | * 7/1976 | Hayashi et al. | 524/505 |
| 4,132,707 A | 1/1979 | Borman | |
| 4,224,264 A | 9/1980 | Ort et al. | |
| 4,312,960 A | 1/1982 | Ort et al. | |
| 4,365,031 A | 12/1982 | Massey et al. | |
| 4,368,284 A | 1/1983 | Tawada et al. | |
| 4,374,949 A | 2/1983 | Massey et al. | |
| 4,412,888 A | 11/1983 | Fremont | |
| 4,414,352 A | 11/1983 | Cohen et al. | |
| 4,430,468 A | 2/1984 | Schumacher | |
| 4,434,258 A | 2/1984 | Schumacher et al. | |
| 4,443,573 A | 4/1984 | Wells et al. | |
| 4,450,200 A | 5/1984 | Iwato et al. | |
| 4,451,606 A | 5/1984 | Campbell | |
| 4,460,731 A | 7/1984 | Kochanowski et al. | |
| 4,467,051 A | 8/1984 | Finax et al. | |
| 4,492,782 A | 1/1985 | Williams et al. | |
| 4,504,608 A | 3/1985 | Kishida et al. | |
| 4,536,531 A | 8/1985 | Ogawa et al. | |
| 4,555,533 A | 11/1985 | Ambros et al. | |
| 4,595,715 A | 6/1986 | Kuze et al. | |
| 4,607,075 A | 8/1986 | Baum et al. | |
| 4,643,921 A | 2/1987 | Terabe et al. | |

(Continued)

FOREIGN PATENT DOCUMENTS

| | | |
|---|---|---|
| EP | 0 060 178 A1 | 9/1982 |
| EP | 0 139 203 A2 | 5/1985 |
| EP | 0 169 085 A1 | 1/1986 |
| EP | 0 258 636 A2 | 3/1988 |
| EP | 0 272 417 A2 | 6/1988 |
| EP | 0 455 370 A2 | 11/1991 |
| EP | 0 459 317 A1 | 12/1991 |
| EP | 0 703 263 A1 | 3/1996 |
| EP | 0 718 341 A2 | 6/1996 |
| FR | 62386 | 10/1987 |
| GB | 1100175 | 9/1965 |
| GB | 1104089 A1 | 8/1966 |
| JP | 45-19789 | 7/1970 |
| JP | 61-250034 A | 11/1986 |
| JP | 2-307117 | 12/1990 |
| JP | 3-39348 A | 2/1991 |
| JP | 4-183716 A | 3/1992 |
| JP | 4-180957 | 6/1992 |
| JP | 4-180967 A | 6/1992 |
| JP | 4-183718 | 6/1992 |
| JP | 5-104621 | 4/1993 |
| JP | 6-65478 A | 3/1994 |
| JP | 6-73205 A | 3/1994 |
| JP | 7-238211 | 9/1995 |
| JP | 8-120066 A | 5/1996 |
| JP | 9-7272191 A | 10/1997 |
| JP | 11-323126 A | 11/1999 |
| JP | 319365 A | 11/2000 |
| WO | WO 99/41297 A1 | 8/1999 |
| WO | WO 00/12793 A1 | 3/2000 |
| WO | WO 00/52094 A1 | 8/2000 |
| WO | WO 00/66659 A1 | 11/2000 |
| WO | WO 01/34703 A1 | 5/2001 |
| WO | WO 02/16464 A2 | 2/2002 |
| WO | WO 02/079309 A1 | 10/2002 |

OTHER PUBLICATIONS

Sorenson, W. R. et al., "*Preparative Methods of Polymer Chemistry*," pp. 130–154, 1968, Interscience Publishers, New York.

Mark, H.F. et al., *Encyclopedia of Polymer Science and Engineering*, 2nd Ed. [12], pp 259–274, 1985, John Wiley & Sons, New York.

Database WPI Section Ch, Week 199029 Derwent Publications Ltd., London, GB; AN 1990–219860 XP002204996 & JP 02 147657A (Nippon Petrochemicals Co., Ltd.), Jun. 6, 1990, Example 4; Table 1 Abstract.

Database WPI Section Ch, Week 198613 Derwent Publications Ltd., London, GB; AN 1986–084972 XP002204997 & JP 61 031429A (Toray Ind. Inc.), Feb. 13, 1986 abstract.

*Primary Examiner*—James J. Seidleck
*Assistant Examiner*—U. K Rajguru
(74) *Attorney, Agent, or Firm*—Burns, Doane, Swecker & Mathis, L.L.P.

(57) ABSTRACT

Polyesters and polyester containers having a reduced coefficient of friction and improved clarity are produced using an antiblock agent comprising a dried talc having from about 20 to about 300 ppm water or a fatty acid tethered talc. The use of these talcs results in polyesters and polyester containers having a coefficient of less than about 1.0 and a clarity with haze values of less than about 4%.

21 Claims, 9 Drawing Sheets

U.S. PATENT DOCUMENTS

| | | | |
|---|---|---|---|
| 4,643,925 A | 2/1987 | Smith et al. |
| 4,654,399 A | 3/1987 | Callander et al. |
| 4,677,150 A | 6/1987 | Chacko et al. |
| 4,699,942 A | 10/1987 | Weaver et al. |
| 4,713,407 A | 12/1987 | Bailey et al. |
| 4,778,858 A | 10/1988 | Ginnings |
| 4,786,673 A | 11/1988 | Morival et al. |
| 4,795,771 A | 1/1989 | Yoshihara |
| 4,820,347 A | 4/1989 | Weber |
| 4,898,897 A | 2/1990 | Kiyohara et al. |
| 4,908,428 A | 3/1990 | Bastioli et al. |
| 4,927,874 A | 5/1990 | Weber |
| 4,929,482 A | 5/1990 | Moritani et al. |
| 4,931,493 A | 6/1990 | Weber |
| 4,948,665 A | 8/1990 | Rosen et al. |
| 4,970,256 A | 11/1990 | Inoue et al. |
| 4,981,896 A | 1/1991 | Okada et al. |
| 4,983,660 A | 1/1991 | Yoshida et al. |
| 4,994,518 A | 2/1991 | Morin et al. |
| 5,000,871 A | 3/1991 | Minayoshi et al. |
| 5,008,230 A | 4/1991 | Nichols |
| 5,039,717 A | 8/1991 | Kawakami et al. |
| 5,082,890 A | 1/1992 | Chou et al. |
| 5,089,553 A | 2/1992 | Umeda et al. |
| 5,114,995 A | 5/1992 | Golder et al. |
| 5,114,996 A | 5/1992 | Golder et al. |
| 5,114,997 A | 5/1992 | Golder et al. |
| 5,114,998 A | 5/1992 | Golder et al. |
| 5,147,920 A | 9/1992 | Dekkers et al. |
| 5,155,145 A | 10/1992 | Foster et al. |
| 5,189,091 A | 2/1993 | Laughner |
| 5,240,980 A | 8/1993 | Danielson et al. |
| 5,258,161 A | 11/1993 | Ealer |
| 5,262,471 A | 11/1993 | Akao |
| 5,288,784 A | 2/1994 | Minayoshi |
| 5,300,558 A | 4/1994 | Kurisu et al. |
| 5,308,892 A | 5/1994 | Zickler et al. |
| 5,316,714 A | 5/1994 | Yoneda et al. |
| 5,322,663 A | 6/1994 | Lai et al. |
| 5,326,806 A | 7/1994 | Yokoshima et al. |
| 5,360,829 A | 11/1994 | Kawabe et al. |
| 5,369,154 A | 11/1994 | Laughner |
| 5,373,046 A | 12/1994 | Okamura et al. |
| 5,376,702 A | 12/1994 | Stibal et al. |
| 5,391,607 A | 2/1995 | Fujii et al. |
| 5,399,603 A | 3/1995 | Sloan et al. |
| 5,449,722 A | 9/1995 | Nishida et al. |
| 5,461,092 A | 10/1995 | Laughner |
| 5,489,640 A | 2/1996 | Riding |
| 5,496,880 A | 3/1996 | Heuseveldt et al. |
| 5,504,130 A | 4/1996 | Riding |
| 5,536,763 A | 7/1996 | Foran |
| 5,571,866 A | 11/1996 | Nishida et al. |
| 5,574,078 A | 11/1996 | Elwakil |
| 5,635,548 A | 6/1997 | Kittle et al. |
| 5,654,347 A | 8/1997 | Khemani et al. |
| 5,712,362 A | 1/1998 | Scholl et al. |
| 5,830,544 A | 11/1998 | Kerscher et al. |
| 5,831,544 A | 11/1998 | Park |
| 5,834,089 A | 11/1998 | Jones et al. |
| 5,840,419 A | 11/1998 | Alder |
| 5,874,517 A | 2/1999 | Huang et al. |
| 5,898,058 A | 4/1999 | Nichols et al. |
| 5,908,890 A | 6/1999 | Cornett |
| 5,919,872 A | 7/1999 | Tung et al. |
| 5,922,828 A | 7/1999 | Schiraldi |
| 5,939,516 A | 8/1999 | Greaves et al. |
| 5,945,460 A | 8/1999 | Ekart et al. |
| 5,976,450 A | 11/1999 | Mreijen |
| 6,020,414 A | 2/2000 | Nelsen et al. |
| 6,048,922 A | 4/2000 | Brink et al. |
| 6,099,789 A | 8/2000 | Sumi |
| 6,110,405 A | 8/2000 | King et al. |
| 6,121,351 A | 9/2000 | Weaver et al. |
| 6,150,454 A | 11/2000 | Wu et al. |
| 6,281,283 B1 | 8/2001 | Heitz et al. |
| 6,284,866 B1 | 9/2001 | Schiavone |
| 6,306,492 B1 | 10/2001 | Yamada et al. |
| 6,323,271 B1 | 11/2001 | Caldwell et al. |
| 6,359,052 B1 | 3/2002 | Trexler, Jr. et al. |
| 6,362,269 B1 | 3/2002 | Ishihata et al. |
| 6,423,764 B1 | 7/2002 | Zhao et al. |
| 6,500,890 B2 * | 12/2002 | Edwards et al. ............ 524/425 |
| 6,503,616 B1 | 1/2003 | Jalan |
| 6,559,271 B2 | 5/2003 | Schaaf et al. |
| 6,569,991 B2 | 5/2003 | Nichols et al. |
| 6,573,359 B2 | 6/2003 | Nichols et al. |
| 6,710,158 B2 | 3/2004 | Edwards et al. |
| 6,727,306 B2 | 4/2004 | Edwards et al. |
| 2002/0077443 A1 | 6/2002 | Nichols |
| 2002/0077445 A1 | 6/2002 | Nichols |
| 2002/0077449 A1 | 6/2002 | Nichols et al. |
| 2002/0091226 A1 | 7/2002 | Nichols et al. |
| 2003/0039783 A1 | 2/2003 | Stafford et al. |
| 2003/0055207 A1 | 3/2003 | Xu et al. |

* cited by examiner

Fig. #1
Effect of Particle Size of Polar Talc on Bottle Sidewall COF in CB-11/Polar Talc Blends
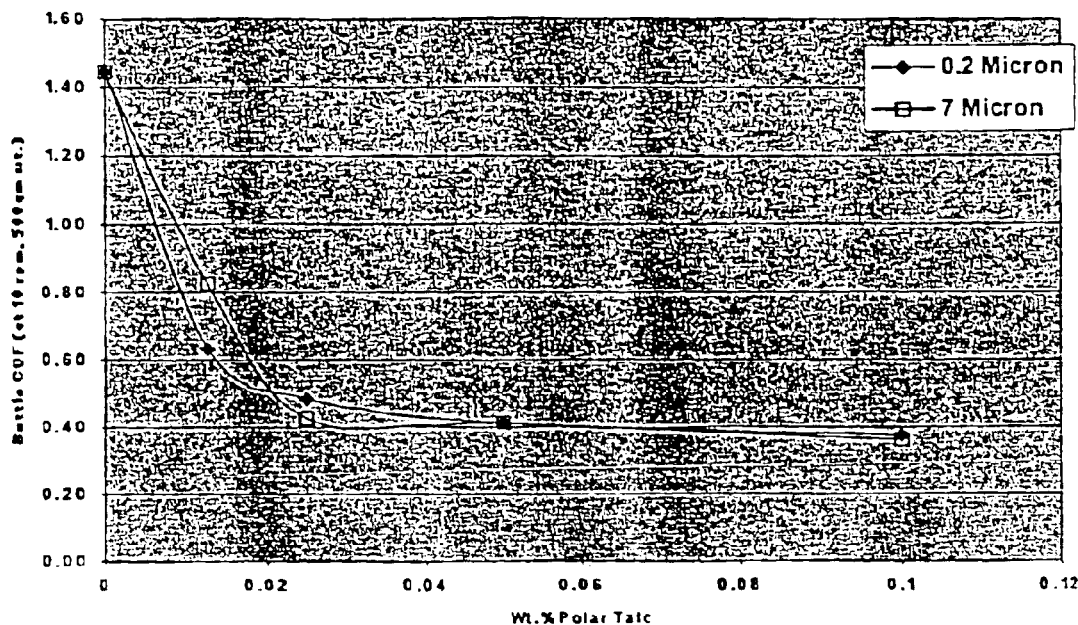
Fig. #2
Effect of Polar Talc Particle Size on %Haze in CB-11/Polar Talc Blends
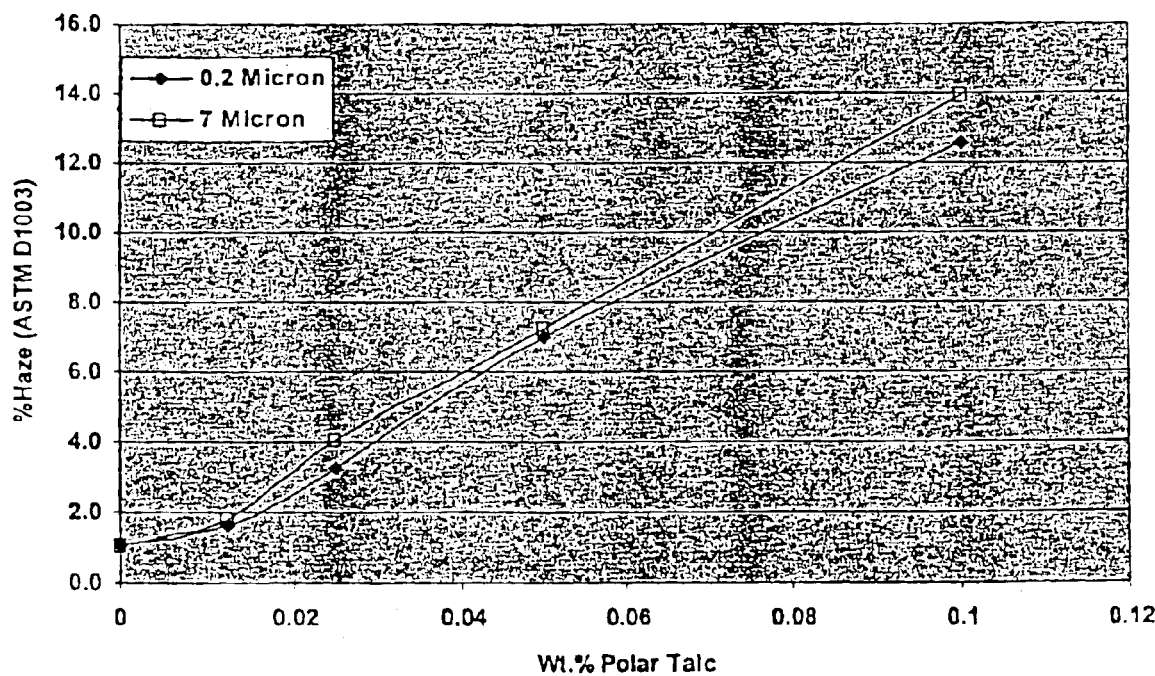

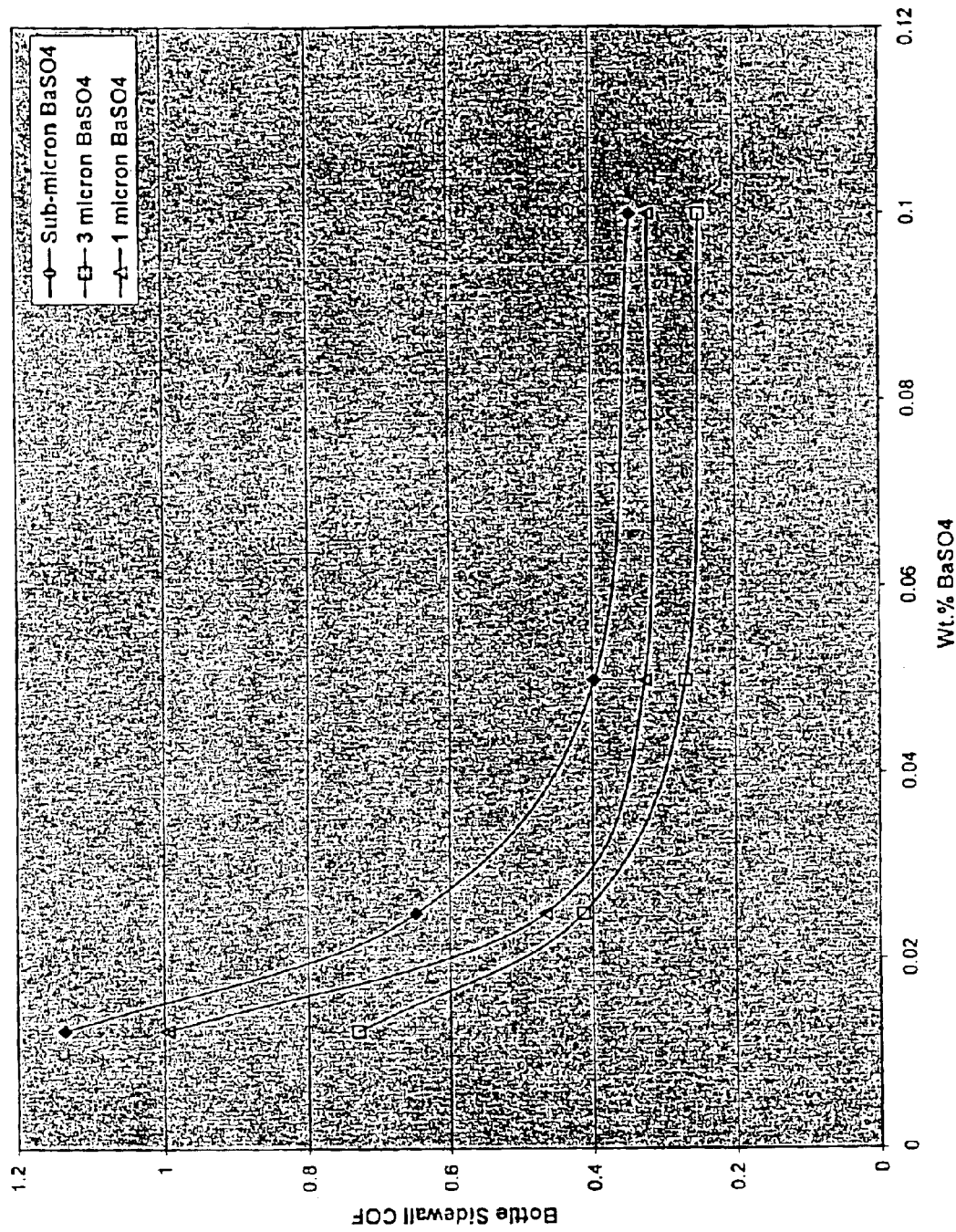

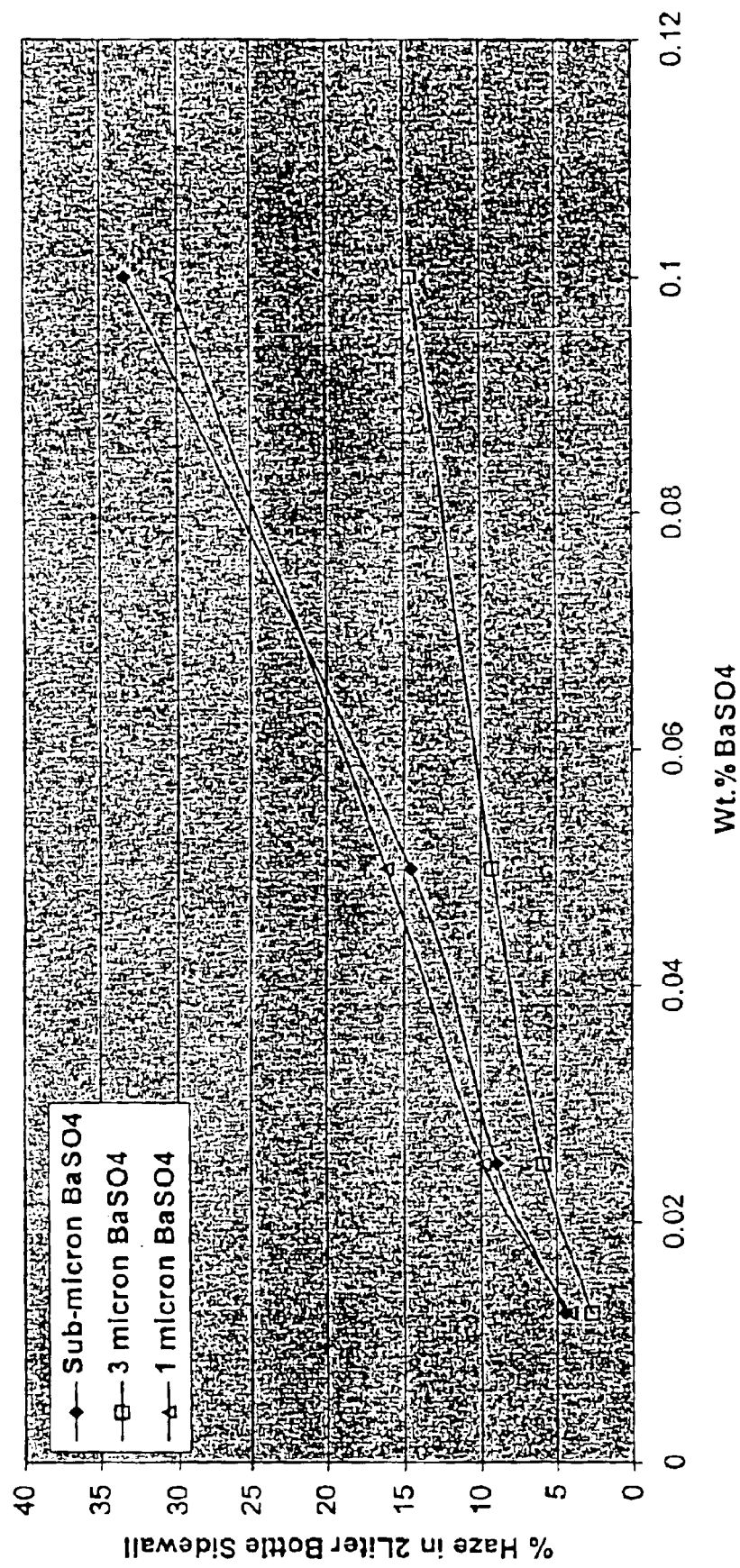

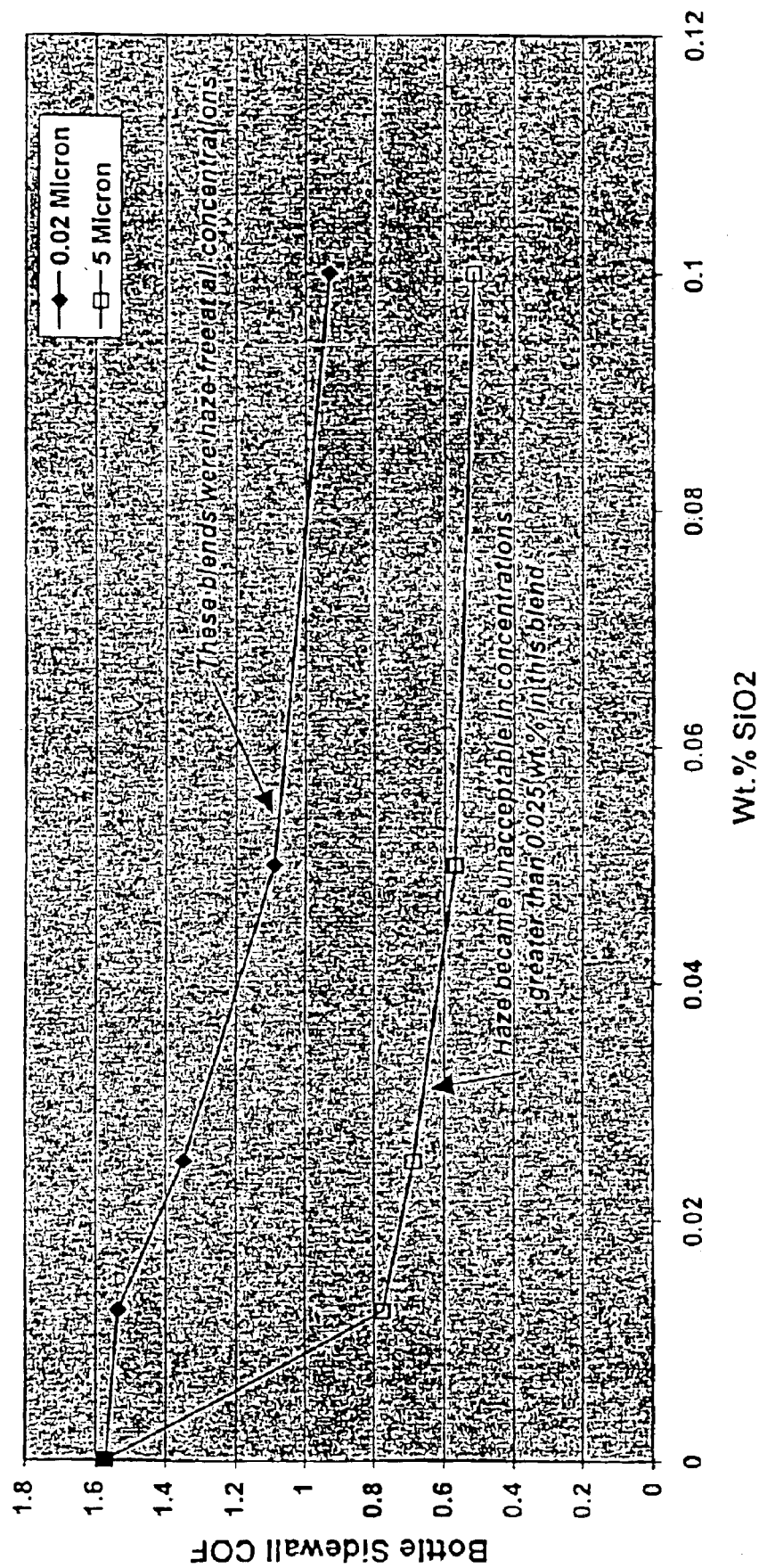

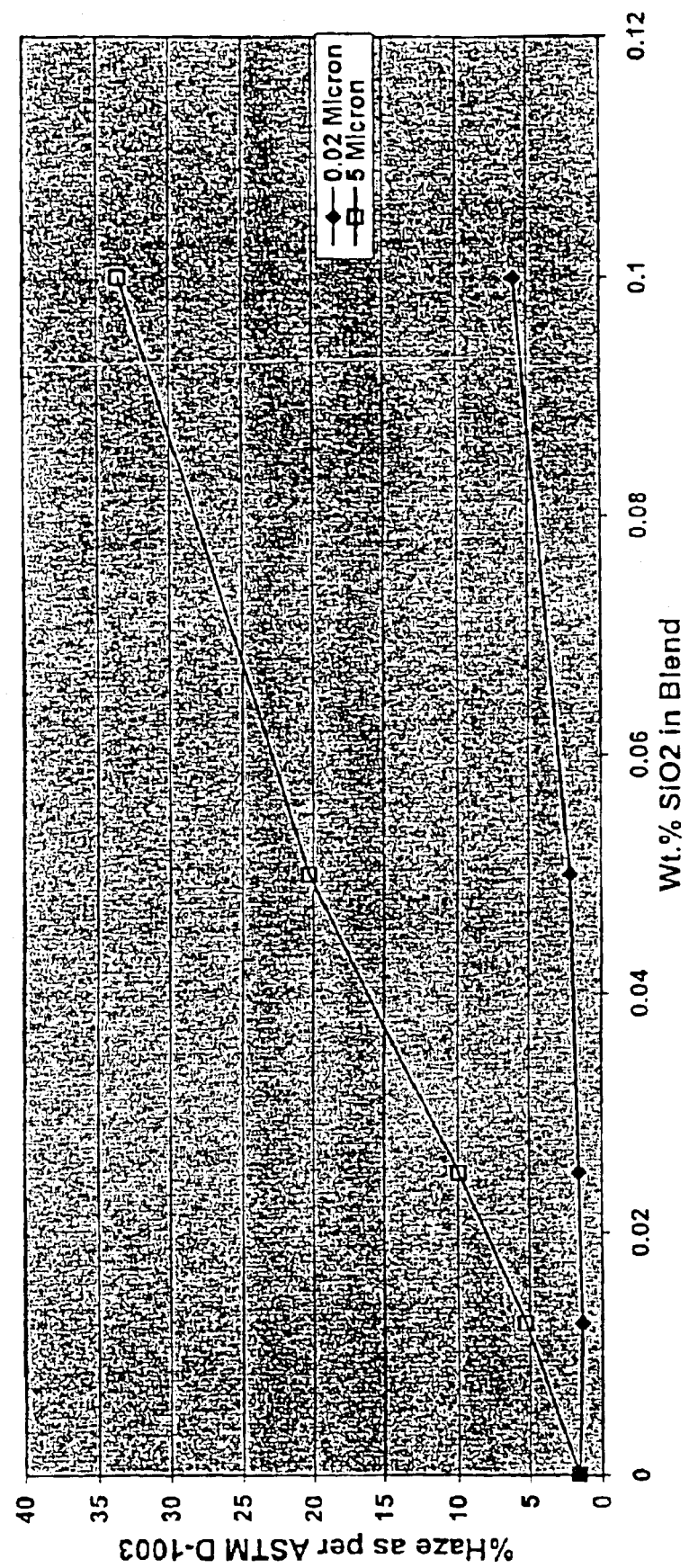

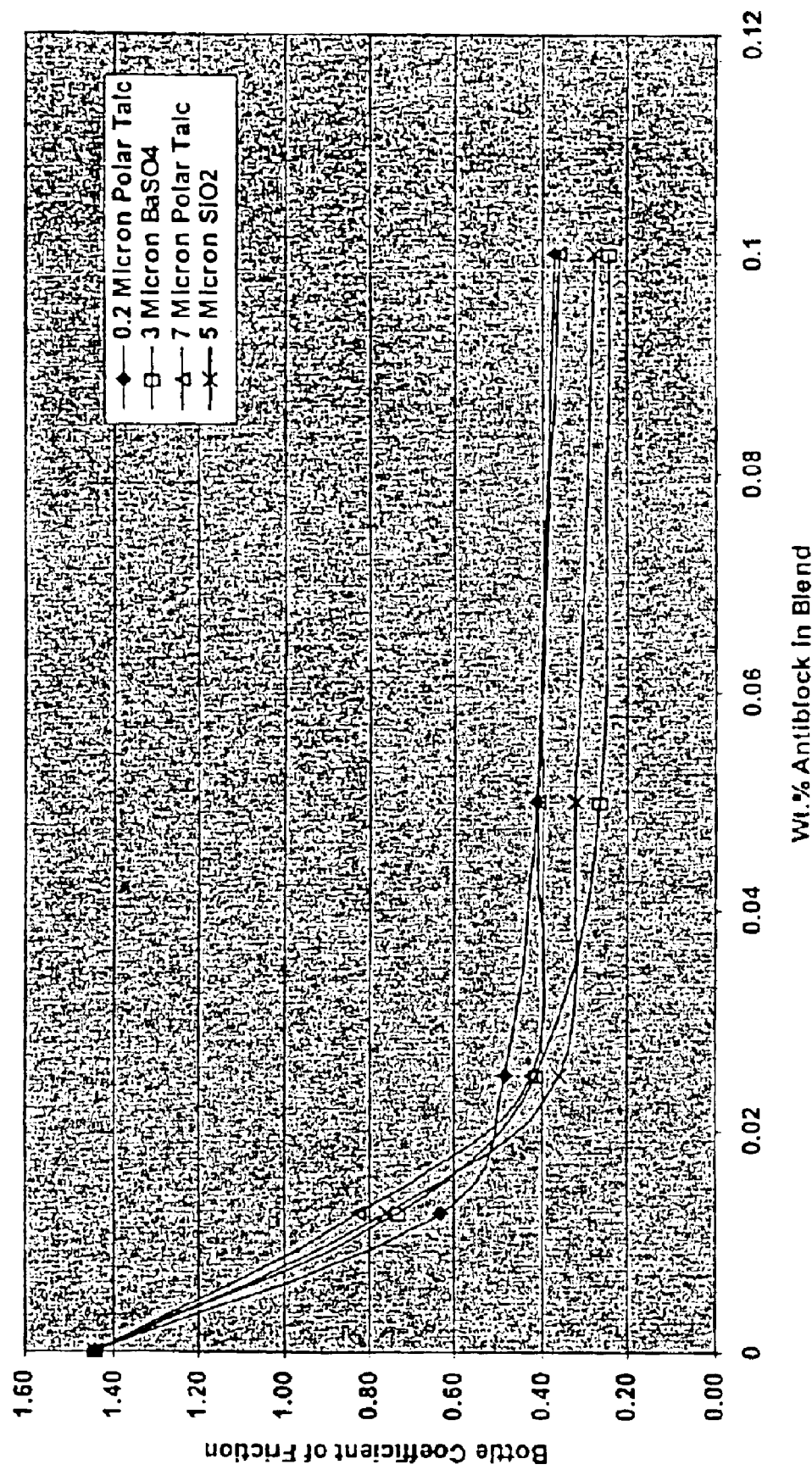
Fig. #7
Comparison of Best Anti-block Additives for Reduction in Bottle Sidewall COF in PET/Anti-block Blends

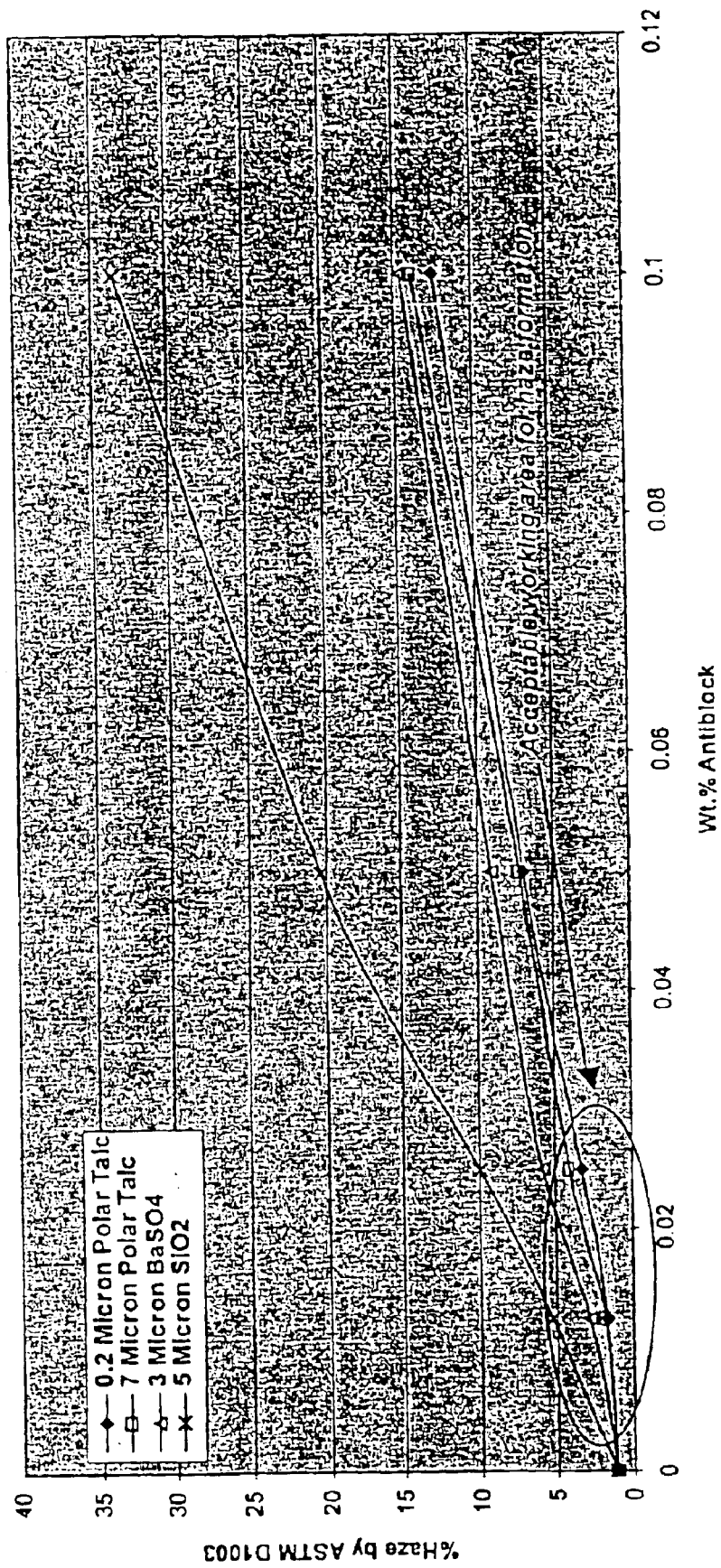
Fig. #8
Comparison of Best Anti-block Additives for Reduction in Bottle Sidewall Haze in PET/Anti-block Blends

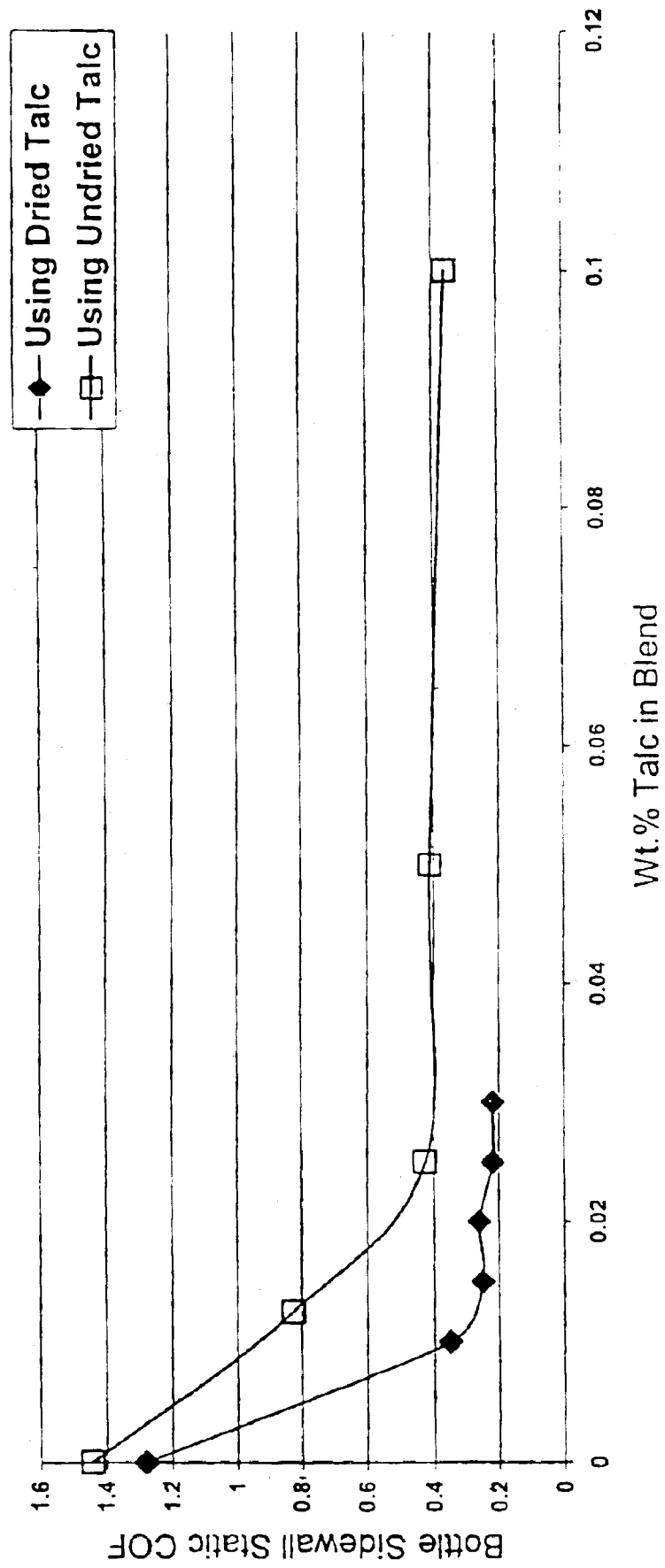
Fig. #9
Comparison of Bottle Sidewall COF using 'Un-dried' and 'Dried' Talc when Preparing the Concentrates

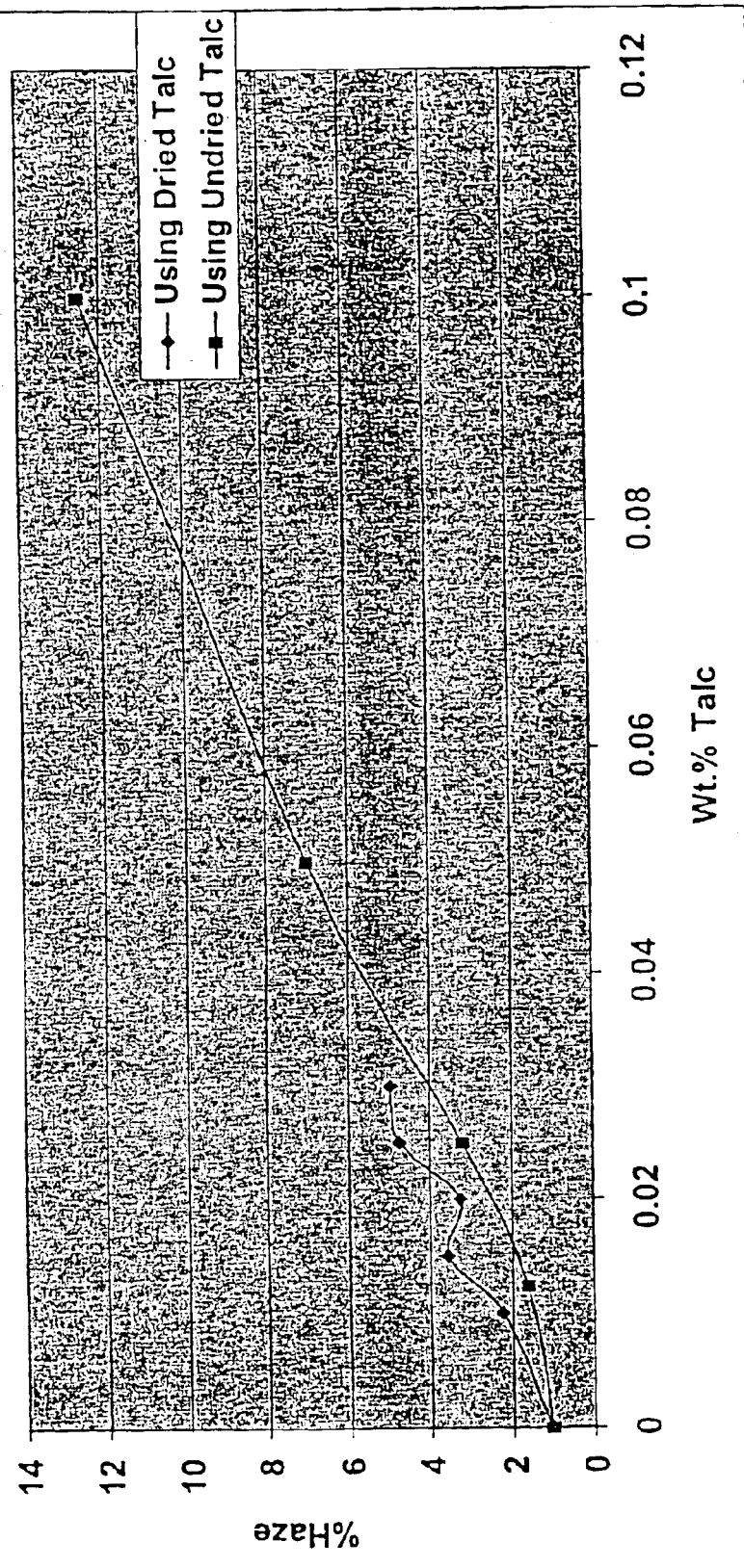
Fig. #10

POLYESTERS AND POLYESTER CONTAINERS HAVING A REDUCED COEFFICIENT OF FRICTION AND IMPROVED CLARITY

CROSS-REFERENCE TO RELATED APPLICATIONS

This application is a continuation of copending U.S. application Ser. No. 10/105,488, filed on Mar. 25, 2002, which in turn claims priority to U.S. Provisional Application Ser. No. 60/280,295, filed Mar. 30,2001, the disclosures of which are incorporated herein in their entirety by this reference.

BACKGROUND OF THE INVENTION

1. Field of the Invention

This invention relates generally to polyesters and polyester containers and particularly to polyesters and polyester containers having a reduced coefficient of friction and improved clarity.

2. Description of the Prior Art

Problems exist in conveying various types of polyester containers due to the excessive amount of static friction encountered when container surfaces contact. This excessive friction can lead to "process line" or "filling line" interruptions that are economically undesirable. The problem occurs after the polyester polymer has been molded into preforms or stretch blown into various types of containers. The containers are sometimes conveyed directly into a palletizing station and then shipped to a filling plant or they are conveyed to a labeling and filling line contained within the same plant. This problem is more pronounced in the carbonated soft-drink ("CSD") industry due to the high speed of stretch-blow molding conveying and filling lines. The problem is also encountered in other parts of the polyester container industry where the containers are being conveyed under pressures applied from congested areas of the conveying process.

During the process of blow molding or injection molding container preforms, the preforms are fed into a large box (gaylord box) that holds more than 1000 preforms. Given the high coefficient of friction ("COF") that is common between polyester surfaces, the preforms tend to stack on top of one another in a conical shape as viewed from the side of the box. This stacking results in fewer preforms being loaded into a box and therefore higher shipping costs per preform. The high level of friction between the preform surfaces can also cause jams in the feeder bin as the preforms are loaded onto the feed rail. Similarly, jams may also occur on the feed rail due to such friction.

Straight-walled containers such as the two liter bottles used in the carbonated soft-drink ("CSD") industry have a very smooth surface that maximizes the amount of surface area that comes in contact between two adjacent bottles. With the inherently high COF of polyester containers such as PET (PET has a static COF greater than 1.0), the containers become entangled and "tip over" or just stop moving in the conveying line after blowing or during filling. Such tip over and stopage obviously causes undesirable disruptions in the conveying or filling process.

A high COF prevents adjacent containers on a multiple-row conveying line from moving (turning or slipping) during conveying. When the conveying line changes direction, sometimes as much as 90 degrees, the containers may become entangled and either stay upright and stop the feed or tip over and stop the line. In either event, someone has to monitor these problem areas at all times to keep the line moving. Therefore, a container having a low static COF that could slide and rotate against other containers during conveying would minimize or eliminate process downtime and the need for someone to constantly monitor the process. These problems are all related to polyesters having an unacceptably COF.

There is prior art relating to methods for reducing the COF for polyesters. One such method involves the addition of an antiblock agents such as silica, talc, calcium carbonate, calcium stearate, and other inorganic compounds. JP 9272191 discloses a multi-layer sheet containing inert particulates (10 to 5000 ppm at 0.5 to 30 micron size) including silica and talc used to improve the slip properties, scratch resistance, cut properties and adhesive properties of the sheet and articles made from the sheet. U.S. Pat. No. 5,840,419 discloses multilayer polyolefin films that use cross-linked silicone in combination with inorganic anti-block agents such as talc in amounts of 500 to 5000 ppm with particles sizes from 1 to 6 micrometers to reduce the COF. Neither reference discloses stretch blow molded containers. U.S. Pat. No. 6,323,271 discloses polyester resins containing a silica selected from the group consisting of fumed silica, colloidal silica and silica beads that is useful for making containers having reduced stickiness relative to containers made from the same resin but without the silica. U.S. Pat. No. 5,258,161 discloses polyolefin films having talc in amounts of 0.05% to 3% by weight as an antiblock agent. U.S. Pat. No. 5,908,890 disclose a polymer film comprising a polyolefin matrix containing a pumice anti-block agent in amounts of less than about 1 percent by weight.

U.S. Pat. No. 5,830,544 discloses poly (ethyleneterephthalate) ("PET") bottles having reduced stickiness due to the addition of amorphous silica at a concentration range of 10 to 100 ppm. The use of additives other than amorphous silica and methods for improving clarity of the bottle containing anti-stick additives are not disclosed. JP Patent Application Heisei 2-307117 discloses the optimization of loading and particulate size of the antiblock on film properties such as haze and COF. The reference does not disclose containers such as plastic bottles nor does it disclose drying an antiblock before processing.

JP Patent Application Heisei 4-180957 discloses mono- and multi-layer sheet and thermoformed moldings formed from PET having 100 to 10,000 ppm talc with particle size less than 10 microns. Suitable thermoformed containers include blister packs that have good clarity. Containers such as plastic bottles, the benefits of drying the antiblock before processing, and the use of fatty acid tethers are not disclosed.

There is prior art relating to polyester films incorporating a variety of inorganic particles to improve crystallinity and slip. JP 7238211 discloses magnetic tape; JP 6065478 discloses magnetic tape, photograph, packaging film; JP5104621 discloses thermoforned sheets; JP 4183718 discloses base film for magnetic tape, photographic film, electrical insulating film, a base material for gold yarn, and packaging material; and JP 4180957 discloses PET w/talc with good slipping and stacking properties with good transparency.

None of the prior art references disclose polyesters or polyester containers having a coefficient of friction of much less than 1.0, particularly polyesters or polyester containers having talc as an antiblock agent. There is, therefore, a need for new and improved polyesters and polyester containers having a reduced COF, particularly high clarity (low haze) containers that have a reduced COF.

SUMMARY OF THE INVENTION

It is, therefore, an object of the invention to provide polyesters and polyester containers having a reduced coefficient of friction and acceptable clarity.

It is another object of the invention to provide polyesters and polyester containers having a reduced coefficient of friction and enhanced clarity.

It is a further object of the invention to provide antiblock agents useful in the production of polyester and polyester containers having acceptable and enhanced clarity.

It is another object of the invention to provide an antiblock agent useful in the production of polyester and polyester containers.

These and other objects are achieved using a dried talc having from about 20 to about 300 ppm water or a fatty acid tethered talc to reduce the coefficient of friction for polyesters and polyester containers. The uses of these talcs result in polyesters and polyester containers having a coefficient of less than about 1.0 and a clarity with haze values of less than about 4%. Such polyesters and polyester containers can be used to package various foods and beverages.

Other and further objects, features and advantages of the present invention will be readily apparent to those skilled in the art.

BRIEF DESCRIPTION OF THE DRAWINGS

FIG. 1 is a graph showing the effect of talc particle size on COF.

FIG. 2 is a graph showing the effect of talc particle size on haze.

FIG. 3 is a graph showing the effect of $BaSO_4$ particle size on COF.

FIG. 4 is a graph showing the effect of $BaSO_4$ particle size on haze.

FIG. 5 is a graph showing the effect of $SiO_2$ particle size on COF.

FIG. 6 is a graph showing the effect of $SiO_2$ particle size on haze.

FIG. 7 is a graph comparing the effect of talc, $BaSO_4$ and $SiO_2$ on COF.

FIG. 8 is a graph comparing the effect of talc, $BaSO_4$ and $SiO_2$ on haze.

FIG. 9 is a graph comparing the effect of dried and undried talc on COF.

FIG. 10 is a graph comparing the effect of dried and undried talc on haze.

DETAILED DESCRIPTION OF THE INVENTION

The term "weight percentages" and the acronym "wt %" as used herein refer to weight percentages based on the total weight of the polyester composition in its final form with all ingredients added.

The term "container" as used herein includes containers and the performs used to manufacture the containers.

In one aspect, the present invention provides polyesters and polyester containers having a reduced coefficient of friction ("COF") and acceptable clarity. The reduced COF is obtained by adding talc, a hydrated magnesium silicate with the chemical formula $Mg_3Si_4O_{10}(OH)_2$, to the polyesters. The talc, or antiblock agent, creates a surface roughness that decreases the COF of the polyester while not adversely affecting the clarity of the polyester or polyester container.

The talc useful in the present invention comprises about 62 wt % $SiO_2$ and about 31% MgO, has a density of about 2.7 grams per cubic centimeter (g/cc), and average particle sizes of from about 0.05 to about 50 microns, preferably from about 0.1 to about 20 microns, most preferably from about 0.2 to about 10 microns. Suitable talc is commercially available from several sources, including Polar Minerals, Inc., 2005 Newpoint Place Parkway, Lawrenceville, Ga. 30043, under the name Polar Talc 9107 or 9103 (with or without fatty acid tether attached).

Before addition to the polyester, the talc is dried so that it contains from about 20 to about 300 ppm water, preferably from about 50 to about 250 ppm water. The use of this "dried talc" is critical to this aspect of the present invention because it permits the production of a polyester with a combination of the maximum reduction in the COF and minimum adverse affect on clarity and haze. The talc can be dried by conventional means, such as a dryer or oven under conditions that are known to skill artisans. If the talc is not dried, a higher loading of the talc will be required. If the talc is not dried, the level of haze acquired for a certain amount of friction reduction will be increased.

The concentration of dried talc in the polyesters of the present invention is from about 0.001 to about 0.1 wt %. Because the clarity of the container decreases with increasing talc concentration, the preferred concentration is from about 0.001 to about 0.05 wt %, most preferably from about 0.005 to about 0.025 wt %.

The polyesters and polyester containers made according to this aspect of present invention have a coefficient of friction of from about 0.01 to about 1.0.

The polyesters and polyester containers made according to this aspect of present invention have an acceptable clarity with haze Values of from about 0.1 to about 4%, preferably from about 0.1 to about 3%.

Other well known antiblock agents useful in the production of polyesters and polyester containers and having properties similar to talc will perform equally well in the present invention when dried so that they contain from about 20 to about 300 ppm water, e.g., amorphous silica, barium sulfate, zinc stearate, calcium phosphate, and mixtures thereof.

In a further aspect, the present invention provides polyesters and polyester containers having a reduced coefficient of friction ("COF") and enhanced clarity. The clarity of the polyesters and polyester containers is enhanced by treating the talc with a fatty acid to attach a tether on the talc ("tethered talc").

Fatty acids useful in the present invention are fatty acids that are compatible with the polyesters and thermally stable at the selected polymerization and/or processing conditions used to make the polyesters and polyester containers. Preferred fatty acids are selected from the group consisting of branched stearic acid, $C_6$ to $C_{20}$ saturated and unsaturated, linear and branched, fatty acids. Most preferred fatty acids are linolic, palnitic, oleic, linoleic, and palmolenic fatty acids.

The talc useful to produce tethered talc is "undried talc" available commercially or "dried talc" produced as described herein. The talc is tethered to the fatty acid by conventional means well known to skilled artisans. Such fatty acid tethered talcs are also commercially available from several sources including Polar Minerals, Inc., 2005 Newpoint Place Parkway, Lawrenceville, Ga. 30043.

Although not bound by theory, it is believed that the fatty acids make the talc more compatible with the polyester and reduce voids upon orientation of the polymer. Voids are caused by incompatibility of the polyester at the interface with the talc. When a container is stretched, if the polyester is not compatible with the talc particulate, it pulls away and creates a void. The organic fatty acid tethers act as a liaison between the inorganic talc particulate and the polyester.

The concentration of tethered talc in the polyesters of the present invention is from about 0.001 to about 0.1 wt %. Because less tethered talc is needed generally, the preferred concentration is from about 0.001 to about 0.04 wt %, most preferably from about 0.005 to about 0.020 wt %.

The polyesters and polyester containers made according to this aspect of present invention have a coefficient of friction of from about 0.01 to about 1.0.

The polyesters and polyester containers made according to this aspect of present invention have an enhanced clarity with haze values of from about 0.1 to about 3%, preferably from about 0.1 to about 2%.

The tethered talc is added to polyesters during the production process to produce polyesters and polyester containers having a reduced coefficient of friction and enhanced clarity.

The talc and the tethered talc can be added to the polyester during the polymerization process or it can be pre-blended with a polyester before processing to form a concentrate. The concentrate can then be mixed with virgin polyester to achieve the desired concentration of talc or tethered talc. Mixtures of dried talc and tethered talc (tethered talc made with dried or undried talc) are embodiments of the present invention.

The polyesters of the present invention can be made using processes well known to skilled artisans. Suitable polyesters can be produced in a conventional manner by the reaction of a dicarboxylic acid having 2 to 40 carbon atoms with polyhydric alcohols such as glycols or diols containing from 2 to about 20 carbon atoms. The processes for producing polyesters, including process conditions, catalysts, sequestering agents, quenching agents, and additives, are known to skilled artisans. Methods of producing polyester materials and combinations of polyesters with other polymeric materials are given in W. R. Sorenson and T. W. Campbell, "Preparative Methods of Polymer Chemistry," (Interscience Publishers, New York 1968, and subsequent editions) and the "Encyclopedia of Polymer Science; and Engineering, 2nd Ed.," H. F. Mark et al., (John Wiley & Sons, New York 1985), particularly Volume 12, pages 1–290 (polyesters generally) and especially pages 259–274 for resin manufacturing processes.

The dicarboxylic acid for producing the polyester is an alkyl dicarboxylic acid having 2 to 20 carbon atoms, or an aryl- or alkyl-substituted aryl dicarboxylic acid containing from 8 to 16 carbon atoms. Additionally, an alkyl dicarboxylic acid diester having from 4 to 20 carbon atoms or an alkyl-substituted aryl dicarboxylic acid diester having from 10 to 20 carbon atoms can be utilized instead of the dicarboxylic acid. Polyhydric glycols or diols containing from 2 to 8 carbon atoms are preferred, most preferably ethylene glycol. Glycol or diol ethers having from 4 to 12 carbon atoms may be substituted for the glycol or diol.

Terephthalate polyesters are made from either dimethyl terephthalate or terephthalic acid with ethylene glycol or from either dimethyl terephthalate or terephthalic acid with 1,4-cyclohexane diol. Suitable dicarboxylic acids include terephthalic acid, isophthalic acid, malonic, succinic, glutaric, adipic, suberic, sebacic, maleic and fumaric acid, all of which are well known dicarboxylic acids, or mixtures of these such that a copolyester is produced. Suitable glycols in addition to ethylene glycol and 1,4-cyclohexane diol, include propylene glycol, 1,3-propanediol, glycerol, 1,2-butanediol, 1,4-butanediol, pentaerythritol, neopentylglycol, similar glycols and diols, and mixtures thereof. These compounds and the processes for making polyesters and copolyesters using the compounds are all well known in the art.

Conventional production of polyethylene terephthalate (and other polyesters such as other terephthalate, isophthalate and mixed terephthalate-isophthalate polyesters) comprises reacting terephthalic acid or dimethyl terephthalate with ethylene glycol at a temperature of about 200° C. to about 250° C. to form monomers and water (or methanol). Because the reaction is reversible, the water (or methanol) is continuously removed to drive the reaction to the production of monomer. Next, the monomer undergoes a polycondensation reaction to form the polymer. During the reaction of the terephthalic acid or dimethyl terephthalate and ethylene glycol, it is not necessary to have a catalyst present although it may be advantageous to do so to increase the rate of reaction. Generally, during the polycondensation reaction, the use of a catalyst is preferred, for example, antimony compounds or other catalyst known to those skilled in the art. In the making of bottle preforms and plastic bottles from the preforms, it is desirable to produce the cleanest, clearest polymer. Generally, the less additives employed, the clearer the polymer produced. Conversely, it is sometimes desirable to make a colored plastic bottle which means that the bottle preform may also be colored. Accordingly, various pigments, dyes, fillers and other substances known to those skilled in the art may be added to the polymer, generally during or near the end of the polycondensation reaction. The specific additives used and the point of introduction during the reaction is known in the art and does not form a part of the present invention. Any conventional system may be employed and those skilled in the art can pick and choose among the various systems for the introduction of additives to select the best for the desired result.

The polyester containers of the present invention can be made using well known processes for producing containers from polyesters. Such processes include injection stretch blow molding and extrusion blow molding. Preferably, such containers are bottles made using a conventional blow molding process well known to skilled artisans.

In another aspect, the present invention provides anti-block agents useful in the production of polyester and polyester containers in the form of talc that has been dried to contain from about 20 to about 300 ppm water. The talc can be treated by any conventional method for removing water but is preferably dried in a conventional oven. The talc is added to polyesters during the production process to produce polyesters and polyester containers having a reduced coefficient of friction and acceptable clarity.

In a further aspect, the present invention provides anti-block agents useful in the production of polyester and polyester containers in the form of dried talc that has been treated with fatty acids to produce a tethered talc.

Suitable polyesters useful in the present invention are well known in the art and are generally formed from repeat units comprising terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexanedimethanol, 1,4-butanediol, and mixtures thereof.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and the like.

In addition, the glycol component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, mixtures thereof and the like. Polyesters may be prepared from two or more of the above diols.

The preferred polyesters of the present invention are poly(ethyleneterephthalate) ("PET"), poly(ethylenenaphthalate) ("PEN"), poly(ethyleneisophthalate) ("PIT"), and poly(ethylenebutyleneterephthalate), with PET being the most preferred., most preferably poly(ethyleneterephthalate) ("PET").

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Also, although not required, other additives normally used in polyesters may be added to the polyester. Such additives include, but are not limited to colorants, toners, pigments, carbon black, glass fibers, fillers, impact modifiers, antioxidants, stabilizers, flame retardants, reheat aids, acetaldehyde reducing compounds, oxygen scavengers, barrier enhancing aids and the like.

This invention can be further illustrated by the following examples of preferred embodiments thereof, although it will be understood that these examples are included merely for purposes of illustration and are not intended to limit the scope of the invention unless otherwise specifically indicated.

EXAMPLES 1 THROUGH 51

The antiblock agents $Ba_2SO_4$, talc, and $SiO_2$ were added to PET CB-12 (CB-12 is a copolyester of terephthalic acid, isophthalic acid, and ethylene glycol commercially available from Eastman Chemical Company as ESTAPAK® CSC Resin) at concentrations of 0.0125 to 0.10 wt % with particle sizes ranging from 20 nanometers to 7 microns. The "undried" antiblock agents were incorporated into the PET in the form of concentrates made by two processes: (1) melt blending on a twin screw extruder into a 1.0 wt % concentrate ("SC/MB") and (2) in situ in the PET preparation to make a 1.0 wt % concentrate ("MBC/MB"). Both methods were evaluated in PET bottles by injection molding pellet/pellet blends on an eight cavity Husky injection molding machine to make 2-liter preforms. The resulting prefomns were stretch blown on a SIDEL ⅔ stretch blow molding machine into 2-liter bottles. The bottles were analyzed for their haze level (sidewall haze was measured using ASTM D-1003) and for coefficient of friction by mounting two bottles perpendicular and in contact with each other, turning one bottle and measuring torque required to turn the second bottle. The coefficient of friction was calculated as $\mu=(Torque/R)/F_2$, where Torque is the output of the torque-sensing device, R is the bottle radius, and $F_2$ is the actual load or force experienced by the bottles at their contact point. The results are shown in Tables 1, 2, and 3 and FIGS. 1 through 8. FIGS. 1 through 6 are graphs comparing the haze, COF, loadings, and particle sizes of the samples. Referring to the Tables and Figures, a comparison of the data show that the polyesters and polyester containers made according to the present invention have a reduced coefficient of friction and acceptable clarity.

FIG. 7 shows that the resulting COF's are very similar for a given loading of antiblock. Comparison of bottle sidewall haze is shown in FIG. 8. The results show that containers made using the talc have a have a slightly higher clarity when compared to containers made using $SiO_2$ and $Ba_2SO_4$.

TABLE 1

Coefficient of Friction for PET/Talc Blends

| Ex. # | Polymer | Prep Method | Particle size ($\mu$) | wt % | Bottle COF Ave | Stdev | Sidewall Haze |
|---|---|---|---|---|---|---|---|
| 1 | CB-12 | SC./MB | 0.2 | 0.0125 | 0.633 | 0.063 | 1.62 |
| 2 | CB-12 | SC./MB | 0.2 | 0.025 | 0.487 | 0.042 | 3.22 |
| 3 | CB-12 | SC./MB | 0.2 | 0.05 | 0.415 | 0.059 | 7.01 |
| 4 | CB-12 | SC./MB | 0.2 | 0.1 | 0.372 | 0.029 | 12.54 |
| 5 | CB-12 | SC./MB | 7 | 0.0125 | 0.827 | 0.074 | 1.84 |
| 6 | CB-12 | SC./MB | 7 | 0.025 | 0.425 | 0.029 | 4.08 |
| 7 | CB-12 | SC./MB | 7 | 0.05 | 0.411 | 0.068 | 7.25 |
| 8 | CB-12 | SC./MB | 7 | 0.1 | 0.360 | 0.036 | 13.96 |
| 9 | CB-12 | MBC/MB | 7 | 0.0125 | 0.953 | 0.200 | 2.71 |
| 10 | CB-12 | MBC/MB | 7 | 0.025 | 0.575 | 0.018 | 4.58 |
| 11 | CB-12 | MBC/MB | 7 | 0.05 | 0.516 | 0.070 | 8.43 |
| 12 | CB-12 | MBC/MB | 7 | 0.1 | 0.485 | 0.053 | 14.22 |

TABLE 2

Coefficient of Friction for PET/BaSO$_4$ Blends

| Example | Polymer | Prep Method | Particle Size ($\mu$) | wt % BaSO$_4$ | COF (Ave of 4 sets) | % Haze (Measured) |
|---|---|---|---|---|---|---|
| 13 | CB-12 CB-12/PP | — | | 0 | 1.443 | 1.07 |

TABLE 2-continued

Coefficient of Friction for PET/BaSO₄ Blends

| Example | Polymer | Prep Method | Particle Size ($\mu$) | wt % BaSO₄ | COF (Ave of 4 sets) | % Haze (Measured) |
|---|---|---|---|---|---|---|
| 14 | PET | SC/MB | — | 0 | 1.617 | 0.7 |
| 15 | CB-12 | SC/MB | <1 | 0.0125 | 1.136 | 4.53 |
| 16 | CB-12 | SC/MB | <1 | 0.025 | 0.649 | 8.85 |
| 17 | CB-12 | SC/MB | <1 | 0.05 | 0.397 | 14.5 |
| 18 | CB-12 | SC/MB | <1 | 0.1 | 0.345 | 33.35 |
| 19 | CB-12 | SC/MB | 3 | 0.0125 | 0.731 | 2.8 |
| 20 | CB-12 | SC/MB | 3 | 0.025 | 0.413 | 5.83 |
| 21 | CB-12 | SC/MB | 3 | 0.05 | 0.270 | 9.16 |
| 22 | CB-12 | SC/MB | 3 | 0.1 | 0.247 | 14.54 |
| 23 | CB-12 | SC/MB | 1 | 0.0125 | 0.996 | 4.22 |
| 24 | CB-12 | SC/MB | 1 | 0.025 | 0.467 | 9.76 |
| 25 | CB-12 | SC/MB | 1 | 0.05 | 0.328 | 16.12 |
| 26 | CB-12 | SC/MB | 1 | 0.1 | 0.320 | 30.56 |
| 27 | CB-12 | MBC/MB | <1 | 0.0125 | 1.076 | 3.67 |
| 28 | CB-12 | MBC/MB | <1 | 0.025 | 0.840 | 7.95 |
| 29 | CB-12 | MBC/MB | <1 | 0.05 | 0.355 | 14.64 |
| 30 | CB-12 | MBC/MB | <1 | 0.1 | 0.282 | 25.08 |
| 31 | CB-12 | MBC/MB | 3 | 0.0125 | 0.714 | 4.17 |
| 32 | CB-12 | MBC/MB | 3 | 0.025 | 0.294 | 6.89 |
| 33 | CB-12 | MBC/MB | 3 | 0.05 | 0.224 | 12.57 |
| 34 | CB-12 | MBC/MB | 3 | 0.1 | 0.189 | 24.08 |
| 35 | CB-12 | MBC/MB | 1 | 0.0125 | 0.973 | 4.89 |
| 36 | CB-12 | MBC/MB | 1 | 0.025 | 0.479 | 9.42 |
| 37 | CB-12 | MBC/MB | 1 | 0.05 | 0.282 | 14.05 |
| 38 | CB-12 | MBC/MB | 1 | 0.1 | 0.268 | 25.06 |

TABLE 3

Coefficient of Friction for PET/SiO₂ Blends

| Example | Polymer | Prep Method | SiO₂ PartSize ($\mu$) | wt % SiO₂ | Bottle COF Ave | Stdev | % Haze (ASTM D-1003) |
|---|---|---|---|---|---|---|---|
| 39 | CB-121 | none | — | 0 | 1.443 | 0.061 | 1.07 |
| 40 | CB-12 | SC/MB | 0.02 | 0.0125 | 1.536 | 0.191 | 1.34 |
| 41 | CB-12 | SC/MB | 0.02 | 0.025 | 1.348 | 0.148 | 1.55 |
| 42 | CB-12 | SC/MB | 0.02 | 0.05 | 1.090 | 0.092 | 2.15 |
| 43 | CB-12 | SC/MB | 0.02 | 0.1 | 0.932 | 0.143 | 5.94 |
| 44 | CB-12 | SC/MB | 5 | 0.0125 | 0.760 | 0.260 | 5.28 |
| 45 | CB-12 | SC/MB | 5 | 0.025 | 0.362 | 0.079 | 9.95 |
| 46 | CB-12 | SC/MB | 5 | 0.05 | 0.324 | 0.058 | 20.31 |
| 47 | CB-12 | SC/MB | 5 | 0.1 | 0.278 | 0.022 | 33.53 |
| 48 | CB-12 | MBC/MB | 5 | 0.0125 | 0.674 | 0.088 | 4.3 |
| 49 | CB-12 | MBC/MB | 5 | 0.025 | 0.317 | 0.080 | 8.34 |
| 50 | CB-12 | MBC/MB | 5 | 0.05 | 0.293 | 0.057 | 12.3 |
| 51 | CB-12 | MBC/MB | 5 | 0.1 | 0.278 | 0.023 | 20.72 |

EXAMPLES 52 THROUGH 63

Polar talc 9107 (7 micron) was dried to approximately 250 ppm moisture and then added to a PET reaction mixture at a loading of 1.0 wt %. The resulting concentrate was used to make blends as described in Example 1. The resulting COF and haze (measured using ASTM D-1003) were determined on the bottles and bottle sidewalls, respectively. Coefficient of friction was measured by mounting two bottles perpendicular and in contact with each other, turning one bottle and measuring torque required to turn the second bottle. The coefficient of friction was calculated as $\mu=(\text{Torque}/R)/F_2$, where Torque is the output of the torque-sensing device, R is the bottle radius, and $F_2$ is the actual load or force experienced by the bottles at their contact point. The results are shown in Table 4 (COF is an average of 4 tests and % Haze is an average of 3 tests). When compared to bottles prepared with "undried" talc (Examples 61, 62, and 63), the results shown graphically in FIG. 9 show that a significant improvement in bottle sidewall COF was obtained at similar loadings when using the "dried" talc. FIG. 10 shows that a significant improvement in % haze was obtained at similar loadings when using the "dried" talc.

TABLE 4

| Example | wt % Talc | Talc, Dried or Undried | COF | % Haze |
|---|---|---|---|---|
| 52 | 0 | Control Sample | 1.28 | 1.04 |
| 53 | 0.01 | Dried | 0.35 | 2.23 |
| 54 | 0.015 | Dried | 0.25 | 3.55 |
| 55 | 0.02 | Dried | 0.26 | 3.23 |
| 56 | 0.025 | Dried | 0.22 | 4.73 |
| 57 | 0.03 | Dried | 0.22 | 4.95 |
| 58 | 0 (repeat) | Control Sample | 1.19 | 0.96 |
| 59 | 0.01 (repeat) | Dried | 0.27 | 2.21 |
| 60 | 0 | Control Sample | 1.443 | 1.070 |
| 61 | 0.0125 | Undried | 0.827 | 1.62 |
| 62 | 0.025 | Undried | 0.425 | 3.22 |
| 63 | 0.05 | Undried | 0.411 | 7.01 |

In the drawings and specification, there have been disclosed typical preferred embodiments of the invention and, although specific terms are employed, they are used in a generic and descriptive sense only and not for purposes of limitation, the scope of the invention being set forth in the following claims. Obviously many modifications and variations of the present invention are possible in light of the above teachings. It is therefore to be understood that within the scope of the appended claims the invention may be practiced otherwise than as specifically described.

What is claimed is:

1. A method for making a polyester polymer, comprising adding about 0.001 to about 0.1 wt % talc containing from about 20 to about 300 ppm water to a process for the production of a polyester polymer, and forming a polyester polymer having a coefficient of friction from about 0.01 to about 1.0.

2. The method of claim 1, wherein the method comprises adding about 0.001 to about 0.05 wt % talc to said process for the production of a polyester polymer.

3. The method of claim 1, wherein the method comprises adding about 0.001 to about 0.02 wt % talc to said process for the production of a polyester polymer.

4. The method of claim 1, wherein the polyester polymer produced has a haze value of from about 0.1% to about 4%.

5. The method of claim 1, wherein the talc has an average particle size from about 0.05 microns to about 50 microns.

6. The method of claim 1, wherein the talc contains from about 50 to about 250 ppm water.

7. The method of claim 1, wherein the talc is a tethered talc.

8. The method of claim 7, wherein the talc has been treated with a fatty acid to produce a tethered talc.

9. The method of claim 1, wherein the polyester polymer produced comprises poly(ethyleneterephthalate), poly(ethylenenaphthalate), poly(ethyleneisophthalate), or poly(ethylenebutyleneterephthalate).

10. The method of claim 1, wherein the polyester polymer produced comprises poly(ethyleneterephthalate).

11. A method for making a concentrate, comprising blending talc containing from about 20 to about 300 ppm water with a polyester polymer to form a concentrate, wherein said concentrate is useful for making a polyester polymer having a coefficient of friction from about 0.01 to about 1.0.

12. A method for making a polyester polymer, comprising blending talc containing from about 20 to about 300 ppm water with a polyester polymer to form a concentrate, and then blending said concentrate with a virgin polyester polymer to form a polyester polymer having a coefficient of friction from about 0.01 to about 1.0.

13. The method of claim 12, wherein said polyester polymer having a coefficient of friction from about 0.01 to about 1.0 has a final concentration of about 0.001 to about 0.05 wt % talc.

14. The method of claim 12, wherein said polyester polymer having a coefficient of friction from about 0.01 to about 1.0 has a final concentration of about 0.001 to about 0.02 wt % talc.

15. The method of claim 12, wherein said polyester polymer having a coefficient of friction from about 0.01 to about 1.0 has a haze value of from about 0.1% to about 4%.

16. The method of claim 12, wherein the talc has an average particle size from about 0.05 microns to about 50 microns.

17. The method of claim 12, wherein the talc contains from about 50 to about 250 ppm water.

18. The method of claim 12, wherein the talc is a tethered talc.

19. The method of claim 18, wherein the talc has been treated with a fatty acid to produce a tethered talc.

20. The method of claim 12, wherein the polyester polymer having a coefficient of friction from about 0.01 to about 1.0 comprises poly(ethyleneterephthalate), poly(ethylenenaphthalate), poly(ethyleneisophthalate), or poly(ethylenebutyleneterephthalate).

21. The method of claim 12, wherein the polyester polymer having a coefficient of friction from about 0.01 to about 1.0 comprises poly(ethyleneterephthalate).

* * * * *